C. Coleman.

Bending Rake Teeth.

No. 3,558. Reissued Jul. 20, 1869.

Witnesses:

A. C. Johnston.

Wesley Johnston.

Inventor:

Columbus Coleman

By his attorney James J. Johnston.

N. PETERS, PHOTO-LITHOGRAPHER, WASHINGTON, D. C.

United States Patent Office.

COLUMBUS COLEMAN, OF ALLEGHENY CITY, PENNSYLVANIA.

*Letters Patent No.* 52,680, *dated February* 20, 1866; *reissue No.* 3,558, *dated July* 20, 1869.

IMPROVED RAKE-TOOTH BENDER.

The Schedule referred to in these Letters Patent and making part of the same.

*To all whom it may concern:*

Be it known that I, COLUMBUS COLEMAN, of the city and county of Allegheny, and State of Pennsylvania, have invented a new and useful Improvement in Machine for Forming or Bending Teeth for Horse-Rakes; and I do hereby declare that the following is a full and exact description thereof, reference being had to the accompanying drawings, and to the letters of reference marked thereon.

The nature of my invention consists in the combination and arrangement of a movable former for the inner curve of rake-teeth, and plane table-leaf, the area of which is more than equal to the space included between the chord and arc of the curve of the largest size of rake-teeth, so as to adapt it to forms for rake-teeth of different size and curvature, said movable form and table-leaf being used in connection with a suitable bending-lever, for giving the desired contour to the rake-teeth.

My invention also consists in combining with the above, and using in connection therewith, a header, for giving the spring-coil to the head or upper end of rake-teeth.

To enable others skilled in the art to make and use my invention, I will proceed to describe its construction and operation.

In the accompanying drawings, which form part of my specification—

In the accompanying drawings—

A represents a table, the top (marked 8) of which should be made of iron.

To this iron-top table-leaf is secured a forming-table leaf, marked B, with a hinged form marked C.

The form B forms the inside line of the curve of the teeth, and the form C forms the outside line of the curve of the teeth.

The forms B and C are so arranged and secured to the top table-leaf 8 of the table A, by screws or bolts, that they can be removed to give place to other forms.

By this arrangement, any desired curve may be given to the teeth by simply changing the forms B and C, which must correspond to the curve desired in the teeth.

D represents a lever, which is furnished with a "header," marked *e*.

The part marked *i* of the "header" is used for forming the spring-coil used in rake-teeth.

The lower end of the part of the "header" marked *i*, is fitted to an opening in the table-leaf 8, which opening serves for a bearing-guide for the lever D and "header" *e*.

The lever D is furnished with a guide, marked *g*.

The forming-piece marked C is hinged at *x*, and is furnished with a handle, marked O.

The construction and arrangement of the various parts will readily be understood by reference to the accompanying drawings.

Figure 1:
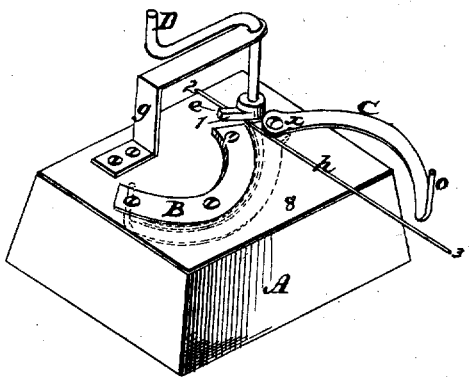
Figure 1 represents a perspective view of my improved machine for bending teeth for horse-rakes.
Figure 2:
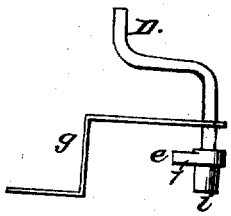
Figure 2 represents a side view of the lever used for giving the spring-coil to the teeth.

The operation of my improvement is as follows:

The rods *h*, of which the teeth are formed, are cut in suitable lengths, and heated in a suitable furnace, and placed in the machine, as represented in fig. 1.

One of the operators catches the end marked 2, of the rod *h*, with tongs, and holds it and the piece marked 1 of the "header" *e* together, and turns the lever D, and thereby gives the desired coil for the spring.

The other operator then takes hold of the end marked 3, of the rod *h*, and bends it against the former B, and then takes hold of the handle O of the forming-piece C, and brings it up against rod *h*, so as to force all parts of it against the former B, and thereby give the true and desired curve to the teeth.

The lever D is then drawn up, so as to remove the part marked *i*, out of the coil, and the former C is moved back, and the curved and coiled teeth removed to give place to another.

Having thus described the nature, construction, and operation of my improvement in machine for forming teeth for horse-rakes,

What I claim as of my invention, is—

The improved bending-apparatus herein described, consisting essentially of a table, A, a series of interchangeable curved formers, and a series of interchangeable curved levers, or their equivalents, as and for the purpose set forth.

Also, in combination with the above, a header, for giving the spring-coil to rake-teeth, substantially as herein described.

COLUMBUS COLEMAN.

Witnesses:

JAMES J. JOHNSTON,

A. C. JOHNSTON.